US012574603B2

(12) United States Patent
Shin

(10) Patent No.: US 12,574,603 B2
(45) Date of Patent: Mar. 10, 2026

(54) DETERMINING A TIME POINT OF USER DISENGAGEMENT WITH A MEDIA ITEM USING AUDIOVISUAL INTERACTION EVENTS

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 4 days.

(21) Appl. No.: 18/120,769

(22) Filed: Mar. 13, 2023

(65) Prior Publication Data

US 2024/0314397 A1     Sep. 19, 2024

(51) Int. Cl.
| | |
|---|---|
| *H04N 21/472* | (2011.01) |
| *H04N 21/45* | (2011.01) |
| *H04N 21/466* | (2011.01) |
| *H04N 21/482* | (2011.01) |

(52) U.S. Cl.
CPC ... *H04N 21/47217* (2013.01); *H04N 21/4532* (2013.01); *H04N 21/466* (2013.01); *H04N 21/482* (2013.01)

(58) Field of Classification Search
CPC ......... H04N 21/47217; H04N 21/4532; H04N 21/466; H04N 21/482
See application file for complete search history.

(56) References Cited

U.S. PATENT DOCUMENTS

| | | | |
|---|---|---|---|
| 9,389,832 B2 * | 7/2016 | Karlsson | G06F 16/447 |
| 9,659,218 B1 | 5/2017 | Shetty et al. | |
| 9,690,455 B1 | 6/2017 | Bilinski et al. | |
| 9,715,901 B1 * | 7/2017 | Singh | H04N 21/8547 |
| 2015/0089520 A1 * | 3/2015 | Lee | H04N 21/44204 725/14 |
| 2016/0012665 A1 * | 1/2016 | Mueller | G07F 17/323 463/31 |
| 2018/0218394 A1 * | 8/2018 | Kerns | G06Q 30/0251 |
| 2022/0229529 A1 * | 7/2022 | Rodgers | G06F 3/0485 |

OTHER PUBLICATIONS

International Search Report and Written Opinion for International Application No. PCT/US2024/019600, mailed Jun. 13, 2024, 14 Pages.

* cited by examiner

*Primary Examiner* — Mulugeta Mengesha
(74) *Attorney, Agent, or Firm* — Lowenstein Sandler LLP

(57)     ABSTRACT

Methods and systems for determining a time point of user disengagement with a media item using audiovisual interaction events are provided herein. A media item is provided to a user for an initial viewing. One or more user interaction events associated with the media item at one or more time points of a plurality of time points within the media item is identified. An indication of a level of user engagement with the media item is determined for each of the one or more user interaction events. A time point of the one or more time points associated with a level of user engagement that satisfies a level of user engagement criterion is identified based on the indication of the level of user engagement for each of the one or more user interaction events. A playback of the media item is caused to be initiated at the identified time point when the media item is provided to the user for a secondary viewing.

20 Claims, 5 Drawing Sheets

300

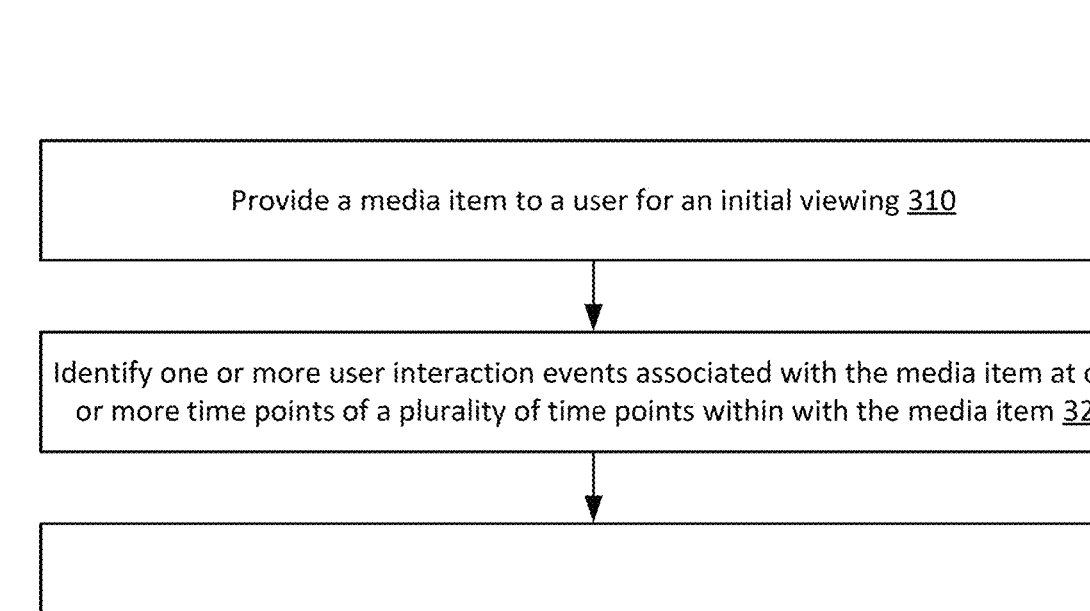

Provide a media item to a user for an initial viewing 310

Identify one or more user interaction events associated with the media item at one or more time points of a plurality of time points within with the media item 320

Determine, for each the one or more user interaction events, an indication of a level of user engagement with the media item 330

Identify, based on the indication of the level of user engagement for each of the one or more user interaction events, a time point associated with a level of user engagement that satisfies a level of user engagement criterion 340

Cause playback of the media item to be initiated at the identified time point when the media item is provided to the user for a secondary viewing 350

FIG. 3

DETERMINING A TIME POINT OF USER DISENGAGEMENT WITH A MEDIA ITEM USING AUDIOVISUAL INTERACTION EVENTS

TECHNICAL FIELD

Aspects and implementations of the present disclosure relate to determining a time point of user disengagement with a media item using audiovisual interaction events.

BACKGROUND

A platform (e.g., a content platform) can transmit (e.g., stream) media items to client devices connected to the platform via a network. A media item can include a video item and/or an audio item, in some instances. Users can consume the transmitted media items via a graphical user interface (GUI) provided by the platform. In some instances, the user may choose to disengage with a transmitted media item before consuming the entire media item, such as to consume another media item or to access another platform. The user may wish to resume consumption of the transmitted media item at a later time without having to consume the entire transmitted media item from the start. Rather, the user may wish to resume at the last timestamp of the transmitted media item that the user consumed before disengaging.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes providing a media item to a user of a platform for an initial viewing. The initial viewing is provided to the user via a first client application, where a local memory is accessible to the first client application and a second client application. The method further includes identifying one or more user interaction events associated with the media item at one or more time points of a plurality of time points within the media item. The method further includes determining, for each of the one or more user interaction events, an indication of a level of user engagement with the media item. The method further includes identifying, based on the indication of the level of user engagement for each of the one or more user interaction events, a time point associated with a level of user engagement that satisfies a level of user engagement criterion. The method further includes causing playback of the media item to be initiated at the identified time point when the media item is provided to the user for a secondary viewing. Causing playback to be initiated at the identified time point includes storing the identified time point in local memory of a client device of the user. The secondary viewing is provided to the user via the second client application in response to a second viewing request that includes an indication of the identified time point.

In some implementations, the one or more user interaction events includes one or more visual interaction events. Identifying the one or more user interaction events includes identifying one or more images of a user interface (UI) on a client device, where the media item is being presented on the UI. The images are provided as input to a machine learning model, where the machine learning model is trained to detect one or more UI elements pertaining to presentation of the media item and a cursor. One or more outputs of the machine learning model is obtained, where the one or more obtained outputs indicate a position of each of the one or more UI elements in the UI and position of the cursor. The one or more visual interaction events is identified based on the one or more obtained outputs. The one or more UI elements pertaining to presentation of the media item include a media player window presenting the media item. Determining the indication of the level of user engagement includes determining whether a threshold portion of the media player is present in the UI. If the threshold portion of the media player window is present in the UI, the method further includes determining a degree of overlap between the position of the cursor and the position of the media player window.

In some implementations, the one or more user interaction events includes one or more audio interaction events. Identifying the one or more user interaction events includes identifying one or more images of the UI on the client device, where audio of the media item is being provided on the client device. The one or more images is provided as input to a machine learning model, where the machine learning model is trained to detect one or more UI elements pertaining to audio semantics. One or more outputs of the machine learning model is obtained, where the one or more obtained outputs indicate location of each of the one or more UI elements in the UI and location of the cursor. The one or more audio interaction events is identified based on the one or more obtained outputs. Determining the indication of the level of user engagement includes determining a degree of overlap between the position of the cursor and the position of each of the one or more UI elements pertaining to audio semantics.

In some implementations, identifying the time point associated with the level of user engagement that satisfies the level of user engagement criterion includes identifying a first time point associated with a level of user engagement indicating a user transitioning to being disengaged with a video portion of the media item. Identifying the time point further includes identifying a second point associated with a level of user engagement indicating a user transitioning to being disengaged with an audio portion of the media item and comparing the first time point with the second time point. In some implementations, in response to determining that the first time point matches the second time point, the method further includes saving the first time point as the identified time point. In some implementations, in response to determining that the second time point precedes the first time point, the method further includes saving the first time point as the identified time point. In some implementations, in response to determining that the first time point precedes the second time point, the method further includes saving either the first time point or the second time point as the identified time point depending on a weight assigned to user engagement in the video portion and a weight assigned to user engagement in the audio portion.

An aspect of the disclosure provides a system including a memory device and a processing device communicatively coupled to the memory device. The processing device performs operations including providing a media item to a user for an initial viewing. The initial viewing is provided to the user via a first client application, where a local memory is accessible to the first client application and a second client application. The operations further include identifying one or more user interaction events associated with the media item at one or more time points of a plurality of time points within the media item. The operations further include determining, for each of the one or more user interaction events, an indication of a level of user engagement with the media item. The operations further include identifying, based on the indication of the level of user engagement for each of the one or more user interaction events, a time point associated with a level of user engagement that satisfies a level of user engagement criterion. The operations further include causing playback of the media item to be initiated at the identified time point when the media item is provided to the user for a secondary viewing. Causing playback to be initiated at the identified time point includes storing the identified time point in local memory of a client device of the user. The secondary viewing is provided to the user via the second client application in response to a second viewing request that includes an indication of the identified time point.

In some implementations, the one or more user interaction events includes one or more visual interaction events. Identifying the one or more user interaction events includes identifying one or more images of a user interface (UI) on a client device, where the media item is being presented on the UI. The images are provided as input to a machine learning model, where the machine learning model is trained to detect one or more UI elements pertaining to presentation of the media item and a cursor. One or more outputs of the machine learning model is obtained, where the one or more obtained outputs indicate a position of each of the one or more UI elements in the UI and position of the cursor. The one or more visual interaction events is identified based on the one or more obtained outputs. The one or more UI elements pertaining to presentation of the media item include a media player window presenting the media item. Determining the indication of the level of user engagement includes determining whether a threshold portion of the media player is present in the UI. If the threshold portion of the media player window is present in the UI, the operations further include determining a degree of overlap between the position of the cursor and the position of the media player window.

In some implementations, the one or more user interaction events includes one or more audio interaction events. Identifying the one or more user interaction events includes identifying one or more images of the UI on the client device, where audio of the media item is being provided on the client device. The one or more images is provided as input to a machine learning model, where the machine learning model is trained to detect one or more UI elements pertaining to audio semantics. One or more outputs of the machine learning model is obtained, where the one or more obtained outputs indicate location of each of the one or more UI elements in the UI and location of the cursor. The one or more audio interaction events is identified based on the one or more obtained outputs. Determining the indication of the level of user engagement includes determining a degree of overlap between the position of the cursor and the position of each of the one or more UI elements pertaining to audio semantics.

In some implementations, identifying the time point associated with the level of user engagement that satisfies the level of user engagement criterion includes identifying a first time point associated with a level of user engagement indicating a user transitioning to being disengaged with a video portion of the media item. Identifying the time point further includes identifying a second point associated with a level of user engagement indicating a user transitioning to being disengaged with an audio portion of the media item and comparing the first time point with the second time point. In some implementations, in response to determining that the first time point matches the second time point, the operations further include saving the first time point as the identified time point. In some implementations, in response to determining that the second time point precedes the first time point, the operations further include saving the first time point as the identified time point. In some implementations, in response to determining that the first time point precedes the second time point, the operations further include saving either the first time point or the second time point as the identified time point depending on a weight assigned to user engagement in the video portion and a weight assigned to user engagement in the audio portion.

An aspect of the disclosure provides a computer program including instructions that, when the program is executed by a processing device, cause the processing device to perform operations including providing a media item to a user for an initial viewing. The initial viewing is provided to the user via a first client application, where a local memory is accessible to the first client application and a second client application. The operations further include identifying one or more user interaction events associated with the media item at one or more time points of a plurality of time points within the media item. The operations further include determining, for each of the one or more user interaction events, an indication of a level of user engagement with the media item. The operations further include identifying, based on the indication of the level of user engagement for each of the one or more user interaction events, a time point associated with a level of user engagement that satisfies a level of user engagement criterion. The operations further include causing playback of the media item to be initiated at the identified time point when the media item is provided to the user for a secondary viewing. Causing playback to be initiated at the identified time point includes storing the identified time point in local memory of a client device of the user. The secondary viewing is provided to the user via the second client application in response to a second viewing request that includes an indication of the identified time point.

In some implementations, the one or more user interaction events includes one or more visual interaction events. Identifying the one or more user interaction events includes identifying one or more images of a user interface (UI) on a client device, where the media item is being presented on the UI. The images are provided as input to a machine learning model, where the machine learning model is trained to detect one or more UI elements pertaining to presentation of the media item and a cursor. One or more outputs of the machine learning model is obtained, where the one or more obtained outputs indicate a position of each of the one or more UI elements in the UI and position of the cursor. The one or more visual interaction events is identified based on the one or more obtained outputs. The one or more UI elements pertaining to presentation of the media item include a media player window presenting the media item. Determining the indication of the level of user engagement includes determining whether a threshold portion of the media player is present in the UI. If the threshold portion of the media player window is present in the UI, the operations further include determining a degree of overlap between the position of the cursor and the position of the media player window.

In some implementations, the one or more user interaction events includes one or more audio interaction events. Identifying the one or more user interaction events includes identifying one or more images of the UI on the client device, where audio of the media item is being provided on the client device. The one or more images is provided as input to a machine learning model, where the machine learning model is trained to detect one or more UI elements pertaining to audio semantics. One or more outputs of the machine learning model is obtained, where the one or more obtained outputs indicate location of each of the one or more UI elements in the UI and location of the cursor. The one or more audio interaction events is identified based on the one or more obtained outputs. Determining the indication of the level of user engagement includes determining a degree of overlap between the position of the cursor and the position of each of the one or more UI elements pertaining to audio semantics.

In some implementations, identifying the time point associated with the level of user engagement that satisfies the level of user engagement criterion includes identifying a first time point associated with a level of user engagement indicating a user transitioning to being disengaged with a video portion of the media item. Identifying the time point further includes identifying a second point associated with a level of user engagement indicating a user transitioning to being disengaged with an audio portion of the media item and comparing the first time point with the second time point. In some implementations, in response to determining that the first time point matches the second time point, the operations further include saving the first time point as the identified time point. In some implementations, in response to determining that the second time point precedes the first time point, the operations further include saving the first time point as the identified time point. In some implementations, in response to determining that the first time point precedes the second time point, the operations further include saving either the first time point or the second time point as the identified time point depending on a weight assigned to user engagement in the video portion and a weight assigned to user engagement in the audio portion.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3 depicts a flow diagram of an example method for determining a time point of a user disengagement with a media item using audiovisual interaction events, in accordance with implementations of the present disclosure.

DETAILED DESCRIPTION

Figure 1:
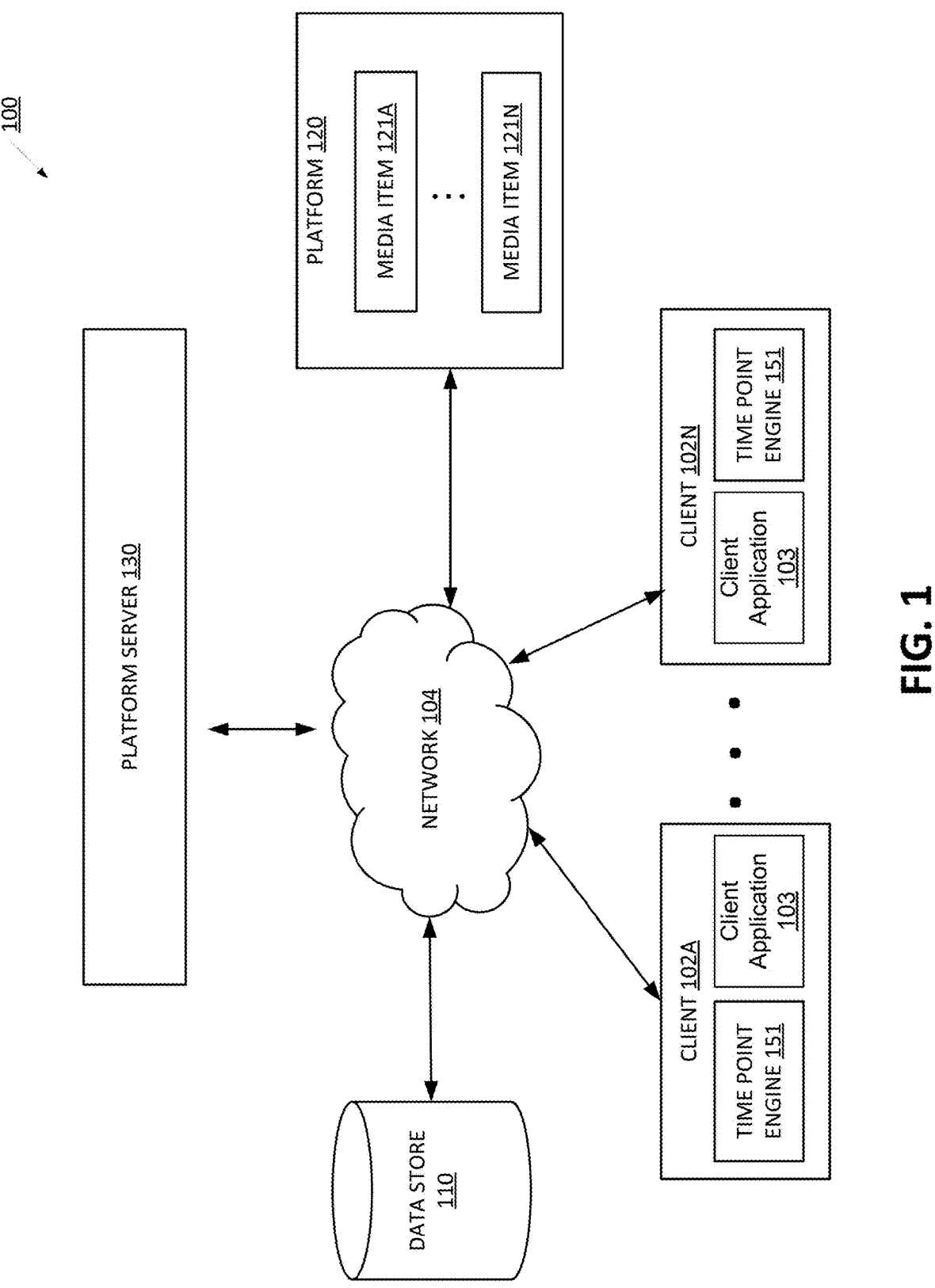
FIG. 1 illustrates an example system architecture, in accordance with implementations of the present disclosure.

Aspects of the present disclosure relate to determining a time point of a user disengagement with a media item using audiovisual interaction events. A platform (e.g., a content platform, etc.) can enable a user to access a media item (e.g., a video item, an audio item, etc.) provided by another user of the platform. For example, a first user of a content platform can provide (e.g., upload) a media item to a content platform via a graphical user interface (GUI) provided by the content platform to a client device associated with the first user. A second user of the content platform can access the media item provided by the first user via a content platform GUI at a client device associated with the second user.

In some instances, when a user accesses the media item, the user can become disengaged with the media item prior to consuming the entire media item (e.g., prior to watching an entire video item and/or prior to listening to an entire audio item). For example, the user can close the application (e.g., a web browser or a mobile application) on the platform on which the user was accessing the media item. The user can switch to another application (e.g., another web browser or another mobile application). The user can choose to watch another media item on the platform or on another platform. In some instances, the user can choose to return to the media item to resume consumption (e.g., to resume watching the video item and/or to resume listening to the audio item). Typically, the user can resume consumption of the media item at the point (e.g., a time point within the media item) at which the user last disengaged from the media item. For example, the platform can initiate playback of a video item at the last viewed video frame before the user switched to another video item. The user can thus continue watching the video item without having to start watching the video item from the start (e.g., an initial time point and/or initial video frame of the video item).

To determine the point at which the user would like to resume consumption of a media item, platforms typically collect and aggregate data (e.g., user data) on a server (e.g., a cloud server), which are then processed in order to determine the meaning of user interaction events, such as the user switching to a different application and/or web browser. However, while the user switching to a different application and/or web browser can be indicative of the user's disengagement with a particular media item being consumed prior to the user's switch, the user can be disengaged with the media item even prior to switching to a different application and/or web browser. For example, the user can mute the audio on the media item to perform another task. In another example, the user can scroll to another area of a user interface on which the media item is not visible or open a window covering the media player presenting the media item, such that the user is no longer engaging with the media item. It can take a significant amount of time and computing resources for such user interaction events to be provided to a server, such as a cloud server, continuously. In addition, there can be privacy limitations to providing such user interaction events to the server. Further, collecting and aggregating data (e.g., user data) to provide to a server is typically done at each platform level, thus making it difficult to use such data on other platforms (e.g., other video item players). For example, if a user stops watching a video on one platform at a certain time point, another platform is typically unaware of this time point and cannot automatically resume playback of the video from the point at which playback was previously stopped.

Aspects of the present disclosure address the above and other deficiencies by providing techniques for determining a time point of a user disengagement with a media item using audiovisual interaction events. A media item creator can provide a media item to a platform for access by one or more users of the platform. The media item can correspond to a video item and/or an audio item. One or more user interaction events associated with the media item can be identified at one or more time points of a set of time points within the media item. For example, the one or more user interaction events can include one or more visual interaction events and/or one or more audio interaction events. The one or more visual interaction events can include a user click operation or a user scrolling operation in relation to one or more user interface (UI) elements that pertain to the presentation of the media item to the user. Such UI elements can include, for example, a media player window that presents the media item, a time bar associated with the media player, a comment section associated with the media item, etc. The one or more audio interaction events can include a user click operation or a user scrolling operation in relation to one or more UI elements that pertain to audio semantics (e.g., a mute button, a volume scroll bar, etc.) or a change in consistency of sound of the media item. Each user interaction event is associated with a time point within the media item.

For one or more user interaction events at each of the above time points within the media item, an indication of a level of user engagement can be determined. For example, for a video interaction event, the indication of the level of user engagement can be a user engagement score that is determined based on whether there is an overlap between the position of the cursor and the position of a corresponding UI element pertaining to the presentation of the media item (e.g., a score of 1 when there is an overlap, a score of 0.5 when the cursor is within a first predefined distance from the UI element, and a score of 0 when the cursor is further from the UI element by at least a second predefined distance that is greater than the first predefined distance). For an audio interaction event, the indication of the level of user engagement can be a user engagement score determined based on whether there is an overlap between the position of the cursor and the position of a corresponding UI element pertaining to audio semantics (e.g., a score of 1 when the cursor is located at the far end of the volume bar, a score of 0 when the cursor is located at the mute position on the volume bar, etc.), or based on whether a change in consistency of the sound of the media item satisfies a threshold criterion (e.g., a score of 1 when change in consistency of the sound of the media item is below a first threshold, a score of 0 when change in consistency of the sound of the media item is above a second threshold that is greater than the first threshold, etc.). The user engagement scores for video and audio interaction events and corresponding time points within the media item can be recorded.

Based on the recorded scores, a time point can be identified that is associated with a level of user engagement that satisfies a level of user engagement criterion (e.g., a time point within the media item can be identified that pertains to when the user is most engaged and/or most disengaged with the media item). This time point can be stored locally on the client device and used to request the media item for a secondary viewing by the user (e.g., when the user requests to view the media item via the same client application or another client application that is different from the client application used for the initial viewing of the media item). In response to this request, playback of the media item can be initiated at the identified time point (e.g., at the time point within the media item at which the user became the most disengaged with the media item).

Aspects of the present disclosure provide technical advantages over previous solutions. Aspects of the present disclosure can improve the experience of a user using a platform application to consume a media item by accurately determining a point within the media item at which to initiate playback of the media item after the user has previously disengaged with the media item. Such accurate determination can also result in more efficient use of processing resources by avoiding consumption of computing resources needed to support navigation of a media item by a user who has to search for the time point at which the media item should be resumed. Further, by determining and recording locally the time point corresponding to the user disengagement with the media item, there can be a reduction in friction in consuming media items across various platforms (e.g., across different video item players). Further, there can be a reduction in bandwidth utilization on the server side by using audiovisual interaction events on a client device, rather than collecting user data and providing the user data to a server, which results in improved performance and reduced latency.

FIG. 1 illustrates an example system architecture 100, in accordance with implementations of the present disclosure. The system architecture 100 (also referred to as "system" herein) includes client devices 102A-N, a data store 110, a platform 120, and/or a platform server 130 each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document and/or a file displayed via a graphical user interface (GUI) on a client device 102, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 and/or platform server 130 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Client devices 102A-N can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.). According to aspects of the disclosure, the content viewer can be a content platform application for users to record, edit, and/or upload content for sharing on platform 120. As such, the content viewers and/or the UI associated with the content viewer can be provided to client devices 102A-N by platform 120. In one example, the content viewers may be embedded media players that are embedded in web pages provided by the platform 120.

A media item 121 can be consumed via the Internet or via a mobile device application, such as a content viewer of client devices 102A-N. In some embodiments, a media item 121 can correspond to a media file (e.g., a video file, an audio file, a video stream, an audio stream, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," "media item," "online media item," "digital media," "digital media item," "content," and "content item" can include an electronic file that can be executed or loaded using software, firmware or hardware configured to present the digital media item to an entity. As indicated above, the platform 120 can store the media items 121, or references to the media items 121, using the data store 110, in at least one implementation. In another implementation, the platform 120 can store media item 121 or fingerprints as electronic files in one or more formats using data store 110. Platform 120 can provide media item 121 to a user associated with a client device 102A-N by allowing access to media item 121 (e.g., via a content platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

Platform 120 can include multiple channels (e.g., channels A through Z). A channel can include one or more media items 121 (e.g., media items 121A-121N) available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more other platforms (not shown) and can provide other services associated with media items 121. For example, another platform can be a third-party advertisement platform that can provide video and/or audio advertisements. In another example, another platform can be a video streaming service provider that provides a media streaming service via a communication application for users to play videos, TV shows, video clips, audio, audio clips, and movies, on client devices 102.

In some embodiments, a client device 102 hosts client application 103 (e.g., a mobile application, a desktop application, a web browser, etc.) that can transmit a request to platform server 130 for a media item 121. Platform server 130 may be part of platform 120 and may identify the media item 121 of the request (e.g., at data store 110, etc.) and may provide access to the media item 121 via the UI of the content viewer (e.g., media player) of the client application 103. In some embodiments, the requested media item 121 may have been generated by another client device 102 connected to platform 120. For example, client device 102A can generate a video item (e.g., via an audiovisual component, such as a camera, of client device 102A) and provide the generated video item to platform 120 (e.g., via network 108) to be accessible by other users of the platform. In other or similar embodiments, the requested media item 121 may have been generated using another device (e.g., that is separate or distinct from client device 102A) and transmitted to client device 102A (e.g., via a network, via a bus, etc.). Client device 102A can provide the video item to platform 120 (e.g., via network 108) to be accessible by other users of the platform, as described above. Another client device, such as client device 102N, can transmit the request to platform 120 (e.g., via network 108) to access the video item provided by client device 102A, in accordance with the previously provided examples.

As illustrated in FIG. 1, the client device 102 can include a time point engine 151 that can be part of client application 103 or another client application (not shown), which can be a mobile application, a desktop application, a web browser, etc. Time point engine 151 can be configured to identify one or more user interaction events at one or more time points of a set of time points within the media item. For example, the one or more user interaction events can include one or more visual interaction events and/or one or more audio interaction events, as discussed in more detail herein. For each of the user interaction events, time point engine 151 can determine an indication of a level of user engagement at a corresponding time point within the media item 121.

When there are multiple user interaction events at a particular time point within the media item 121, time point engine 151 can further perform an aggregation of the level of user engagement at this time point. For example, a user interaction event of a certain type can be assigned (e.g., associated with) a weighted value. The weighted value can be based on an importance level of each type of user interaction event. For example, the weighted value can be assigned to each type of user interaction event empirically (e.g., based on offline testing). Accordingly, time point engine 151 can determine a level of user engagement at individual time points within the media item and find a time point that is associated with a level of engagement that satisfies a level of user engagement criterion. The level of user engagement criterion can be a level of user engagement at which the user is the most disengaged with the media item 121. Time point engine 151 can store the time point in association with an identifier of the media item 121 locally on the client device 102. In some embodiments, time point engine 151 can also provide the time point associated with user disengagement to platform server 130, which can store it in data store 110 in association with the media item 121 and the user account of the user of client device 102.

Subsequently, the user of client device 102 may want to resume playback of the media item 121 via the client application 103. In response, the client application 103 may request the media item 121 from platform server 130. If the time point associated with user disengagement with the media item was not previously provided to platform server 130, the request of the client application 103 may include this time point, which was previously stored in local memory of client device 102 by time point engine 151. Alternatively, the user of client device 102 may want to resume playback of the media item 121 via another client application associated with a different platform than platform 120. In response, the other application may request the media item 121 from the different platform and include in the request the time point associated with the media item 121 that was previously stored in local memory of client device 102 by time point engine 151.

It should be noted that although FIG. 1 illustrates time point engine 151 as part of client device 102, in additional or alternative embodiments, time point engine 151 can reside on one or more server machines such as platform server 130 or server(s) of a platform other than platform 120.

It should be noted that in some other implementations, the functions of platform server 130 and/or platform 120 can be provided by a fewer number of machines. For example, in some implementations, components and/or modules of any of platform server 130 and/or platform 120 may be integrated into a single machine, while in other implementations components and/or modules of any of platform server 130 and/or platform 120 may be integrated into multiple machines.

In general, functions described in implementations as being performed by platform 120 and/or platform server 130 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2A:
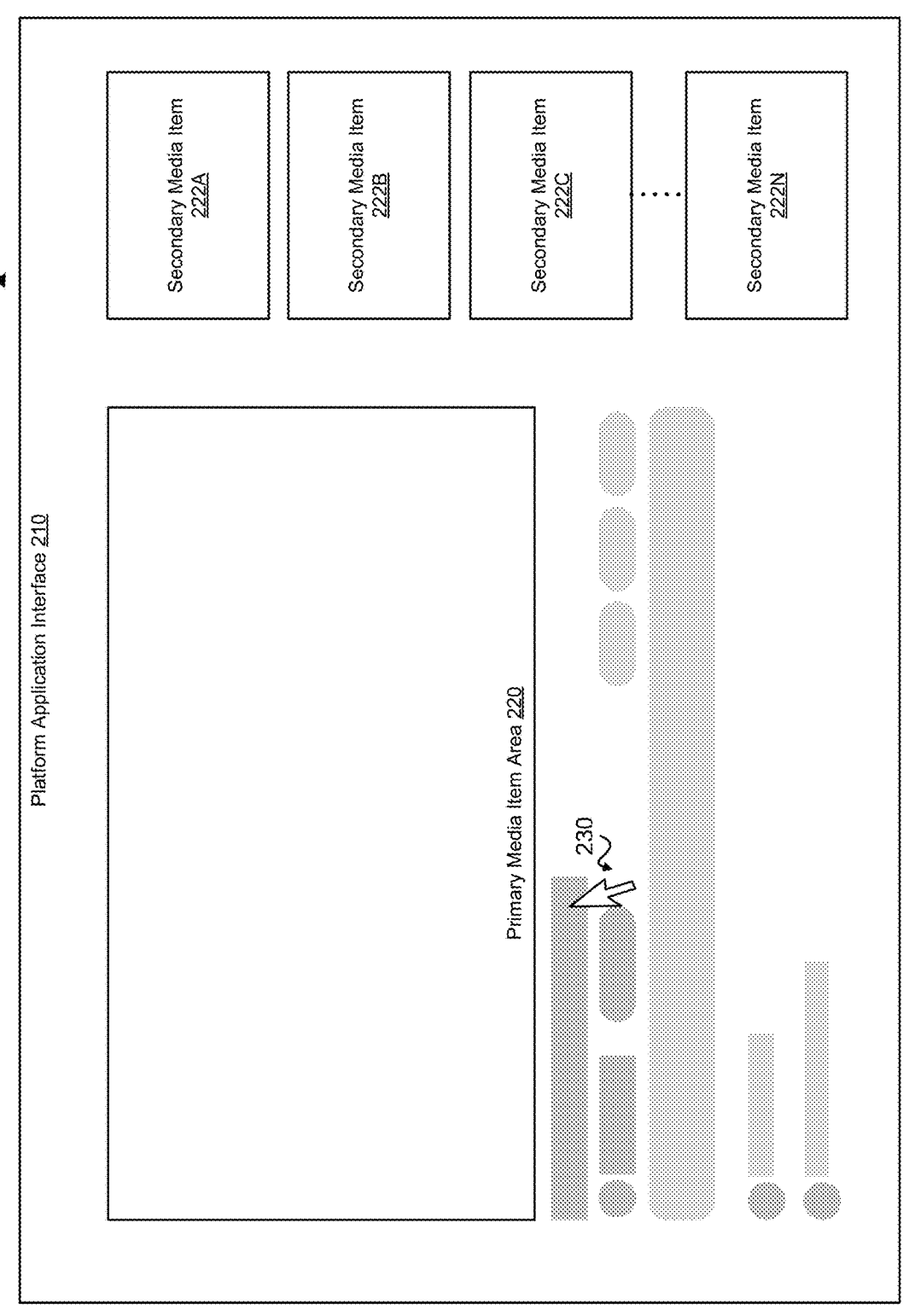
FIGS. 2A-2B illustrate example interfaces for determining a time point of a user disengagement with a media item using audiovisual interaction events, in accordance with implementations of the present disclosure.
Figure 2B:
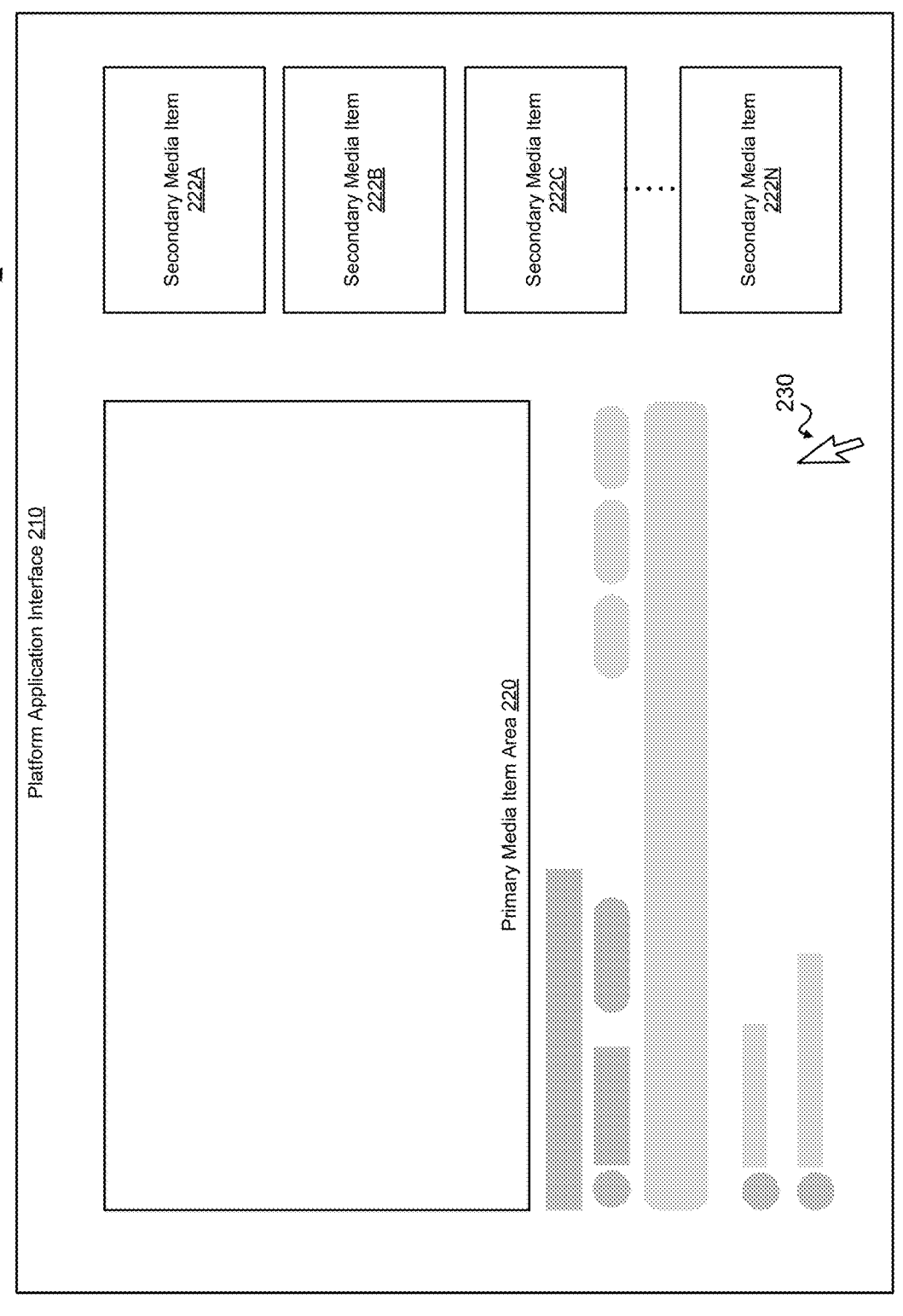

FIGS. 2A-2B illustrate examples of a user interface (UI) 200 of a content viewer provided by platform 120 of FIG. 1, in accordance with implementations of the present disclosure. FIGS. 2A-2B may include graphical user interfaces (GUIs) provided by an application (e.g., platform 120 of FIG. 1) of a client device. The application may be associated with/provided by a content platform (e.g., platform server 130 of FIG. 1) and may include a web browser application, a mobile application, a desktop application, or the like. User interaction with various elements of interfaces of FIGS. 2A-2B may cause changes to the interface elements presented. Various interactions between the interfaces and interface elements presented in FIGS. 2A-2B are possible (e.g., interacting with an element of a first UI layout may cause a transition to a second interface layout), and any transition between sample interfaces, similar interfaces, inclusion of similar interface elements, etc., are within the scope of this disclosure. FIGS. 2A-2B are described in connection with video content items, but other types of content items (e.g., image content, text content, audio content, etc.) may be presented in similar interfaces.

In some embodiments, UI 200 can include one or more of a primary media item area 220 and secondary media items 222A-N. Primary media item area 220 may be a focus area for playback of a media item. For example, primary media item area 220 may be a media (e.g., video) player and secondary media items 222A-N may correspond to secondary video media items related and/or unrelated to primary media item area 220. Primary media item area 220 and secondary media items 222A-N may each contain one or more interface elements.

In some embodiments, UI 200 can present a cursor 230. Cursor 230 may be controlled by an input device (e.g., mouse, trackpad, trackball, joystick, etc.) of a client device of a user of platform 120 of FIG. 1. Client device 102 may include a cursor tracker that may periodically store a position of cursor 230 in a local memory of the client device at intervals of time t (e.g., $P_{t-3}$, $P_{t-2}$, $P_{t-1}$, $P_t$). As illustrated in FIG. 2A, the cursor 230 can be proximate to a UI element associated with the primary media item area 220. In some embodiments, the position of the cursor 230 can be a visual interaction event, as described herein. As illustrated in FIG. 2B, the cursor 230 can be further away from the primary media item area 220. In some embodiments, the position of the cursor 230 can be indicative of a level of user engagement at a particular time point within a media item being consumed in the primary media item area 220. For example, a position of the cursor 230 closer to the primary media item area 220 can indicate a greater level of user engagement at a particular time point. A position of the cursor 230 further away from the primary media item area 220 can indicate a lower level of user engagement at a particular time point. Further details with regard to determining the level of user engagement is described herein.

FIG. 3 depicts a flow diagram of an example method for determining a time point of a user disengagement with a media item using audiovisual interaction events, in accordance with implementations of the present disclosure. Method 300 can be performed by processing logic that can include hardware (circuitry, dedicated logic, etc.), software (e.g., instructions run on a processing device), or a combination thereof. In one implementation, some or all of the operations of method 300 can be performed by one or more components of system 100 of FIG. 1. In some embodiments, some or all of the operations of method 300 can be performed by client device 102 (e.g., time point engine 151 of client application 103), as described above.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

In some embodiments, at block 310, the processing logic implementing method 300 provides a media item (e.g., the media item 121 of FIG. 1) for presentation to a user of a platform (e.g., the platform 120 of FIG. 1). In some embodiments, the processing logic provides the media item to the user for an initial viewing. In some embodiments, the media item can be a video item and/or an audio item.

At block 320, the processing logic identifies one or more user interaction events associated with the media item. In some embodiments, the processing logic identifies the one or more user interaction events associated with the media item at one or more time points within the media item. In some embodiments, the one or more user interaction events can include one or more visual interaction events and/or one or more audio interaction events.

In some embodiments, to identify one or more visual interaction events, the processing logic can identify, using a client component (e.g., the client application 103 of FIG. 1), one or more images of a user interface (UI) presented on a client device associated with the user of the platform (e.g., the client device 102 of FIG. 1), where the media item is being presented on the UI. In some embodiments, the processing logic can provide the one or more identified images as input to a machine learning model stored in local memory on the client device, such as a deep network. An example of a deep network is a neural network with one or more hidden layers, such as a convolutional neural network (CNN). The machine learning model can be trained by, for example, adjusting weights of a neural network in accordance with a backpropagation learning algorithm or the like. In some embodiments, the machine learning model can be trained on training data to detect one or more UI elements of the UI that pertain to the presentation of a media item. In some embodiments, the training data contains training inputs including prior images of UIs and corresponding target outputs including one or more labels of UI elements that pertain to video presentation and/or one or more labels of cursors. For example, when training a CNN machine learning model on training input data that includes prior images of UI, each layer of the CNN can generate various activation maps. Each activation map can recognize one or more relevant features (e.g., one or more UI elements) of the given prior images. For example, the UI elements can include a media player window that presents the media item, a time bar associated with the media player, etc. In some embodiments, the processing logic can obtain one or more outputs of the trained machine learning model. The one or more outputs of the trained machine learning model can identify the one or more UI elements of the UI that presents the media item, positions of these UI elements and/or positions of the cursor. In some embodiments, the processing logic can identify, using the one or more obtained outputs, the one or more visual interaction events. For example, the one or more visual interaction events can be identified based on the positions of the UI elements pertaining to the presentation of the media item, the positions of the cursor and corresponding user operations (e.g., a click operation, a drag operation, a scrolling operation, etc. that occurred at the time the inputs (the one or more images of the UI) for the machine learning model were obtained). For example, if the output of the trained machine learning model indicates that the location of the cursor overlaps with the time bar of the media player at a certain time point, and a user click operation is detected at the same time point, then a time bar interaction event can be identified.

In some embodiments, to identify one or more audio interaction events, the processing logic can determine, using a client component (e.g., the client application 103 of FIG. 1), one or more audio semantics associated with the client device of the user of the platform. For example, the processing logic can determine whether the cursor is interacting with one or more UI elements that pertain to audio semantics (e.g., a mute button, a volume scroll bar, etc.), or whether there is a change in consistency of sound of the media item. In some embodiments, the processing logic can provide the one or more identified images as input to a machine learning model stored in local memory on the client device, such as a deep network. The machine learning model can be trained on training data to detect one or more UI elements of the UI. In some embodiments, the training data contains training inputs including prior images of UIs and target outputs including one or more labels of UI elements that pertain to audio semantics and/or one or more labels of cursors. In some embodiments, the processing logic can obtain one or more outputs of the trained machine learning model that can identify the one or more UI elements of the UI that presents the media item, positions of these UI elements and/or positions of the cursor. In some embodiments, the processing logic can identify, using the one or more obtained outputs, the one or more audio interaction events. For example, the one or more audio interaction events can be identified based on the positions of the UI elements pertaining to audio semantics, the positions of the cursor and corresponding user operations (e.g., a click operation, a drag operation, a scrolling operation, etc.). For example, if the output of the trained machine learning model indicates that the location of the cursor overlaps with the mute button of the media player at a certain time point, and a user click operation is detected at the same time point, then an audio mute event can be identified.

In addition or alternatively, the processing logic can use a trained machine learning model to identify a change in consistency of sound of the media item based on one or more audio signals provided as input to the trained machine learning model, which can be a deep network. The machine learning model can be trained using training input data that includes audio signals of prior media items and target output data indicating whether a change in consistency of sound of a corresponding media item has occurred.

At block 330, the processing logic determines, for one or more user interaction events at each of the above time points within the media item, an indication of a level of user engagement with the media item. In some embodiments, the indication of the level of user engagement can be a user engagement score, such as a score of 0 to 1, where 0 can be indicative of disengagement with the media item, and 1 can be indicative of active engagement with the media item. In some embodiments, the indication of the level of user engagement for a visual interaction event can be determined based on whether a threshold portion of the media player window is present (visible) in the UI (e.g., whether the media item is being played in the foreground or background due to the media player window being mostly covered by another window). If the threshold portion of the media player window is not visible in the UI, the processing logic can decide that the user is not engaged with the visual component of the media item. Otherwise, if at least the threshold portion of the media player window is present in the UI, the processing logic can further determine the indication of the level of user engagement for the visual interaction event based on a degree of overlap between the position of the cursor and the position of the media player window and/or positions of other UI elements pertaining to the presentation of the media item.

In some embodiments, for an audio interaction event, the indication of the level of user engagement can be determined based on a degree of overlap between the position of the cursor and the position(s) of one or more UI elements that pertain to audio semantics or based on whether a change in consistency of the sound of the media item satisfies a threshold criterion.

In some embodiments, determining the indication of the level of user engagement with the media item can include obtaining a cursor position e.g., as described with respect to FIGS. 2A-2B. In some embodiments, the processing logic can identify an area of the UI, such as a media player window, where the media item is being presented within the media player window (e.g., the primary media item area 220 of FIGS. 2A-2B). In some embodiments, the processing logic can determine a degree of overlap between the cursor position and the identified area of the UI, e.g., as described with respect to FIGS. 2A-2B. The current position of the area of the UI can include an x-offset and a y-offset relative to the UI.

At block 340, the processing logic identifies, based on the indication of the level of user engagement for each of the one or more user interaction events, a time point that is associated with a level of user engagement that satisfies a level of user engagement criterion. In some embodiments, the level of user engagement criterion can be a level at which the user is the most disengaged or a level at which the user is most engaged with a media item. In some embodiments, the processing logic can identify a time point for a level of user engagement indicating that a user is transitioning to being disengaged with a video portion of the media item. For example, the processing logic can identify that a level of user engagement for a particular visual interaction event satisfies a level of user engagement criterion (e.g., the level of user engagement is below than a level of engagement threshold). The processing logic can identify the time point associated with such level of user engagement with the video component of the media item. The processing logic can also identify a time point for a level of user engagement that indicates a user is transitioning to being disengaged with an audio portion of the media item. For example, the processing logic can identify that a level of user engagement for a particular audio interaction event satisfies a level of user engagement criterion (e.g., the level of user engagement is below than a level of engagement threshold). The processing logic can identify the time point associated with such level of user engagement with the audio component of the media item.

In some embodiments, the processing logic can determine whether the identified time point (e.g., the first time point) for the particular visual interaction event matches (e.g., is the same time point as or is close to) the identified time point (e.g., the second time point) for the particular audio interaction event. In response to determining that the first time point matches the second time point, the processing logic can save the first or second time point as the identified time point indicating user disengagement with the media item (e.g., the matched time points indicate that the user has a clean transition on engaging in content to no longer engaging in content, and thus either of the two time points can be subsequently used when the user resumes playback of the media item).

In some embodiments, the processing logic can determine that the second time point for the particular audio interaction event precedes (e.g., is an earlier time point than) the first time point for the particular visual interaction event. In response to determining that the second time point precedes the first time point, the processing logic can save the second time point as the identified time point for user disengagement with the media item (e.g., the above comparison result can indicate that the part of the video can have visual dynamics but the audio is silent, and that the engagement could still happen until the end of the video, and thus the second time point can be subsequently used when the user resumes playback of the media item).

In some embodiments, the processing logic can determine that the identified time point (e.g., the first time point) for the particular visual interaction event precedes (e.g., is an earlier time point than) the identified time point (e.g., the second time point) for the particular audio interaction event. This can indicate, for example, that the audio transition is lagging due to the off screen navigation that the user is performing (e.g., video streaming in background, so on-screen pixels do not show video). In this scenario, the saved time point can be either defined by the audio transition or the video transition based on whether the user puts more weight around video engagement or audio engagement. Thus, in response to determining that the first time point precedes the second time point, the processing logic can save either the first time point or the second time point as the identified time point for user disengagement with the media item based on an aggregate weight assigned to the level of user engagement in the video portion and an aggregate weight assigned to the level of user engagement in the audio portion. For example, each user interaction event can be assigned a weighted value. The weighted value can be based on an importance level of each user interaction event. The weighted value can be assigned to each user interaction event based on testing and experimental data.

At block 350, the processing logic causes playback of the media item to be initiated at the time point identified at block 340 by storing the identified time point in local memory of a client device of the user. In some embodiments, when the media item is provided to the user for a secondary viewing (e.g., when the user is being provided the media item via the same client application or another client application different from the client application used for the initial viewing of the media item), playback of the media item can be initiated at the identified time point (e.g., at the time point when the user became the most disengaged with the media item).

Figure 4:
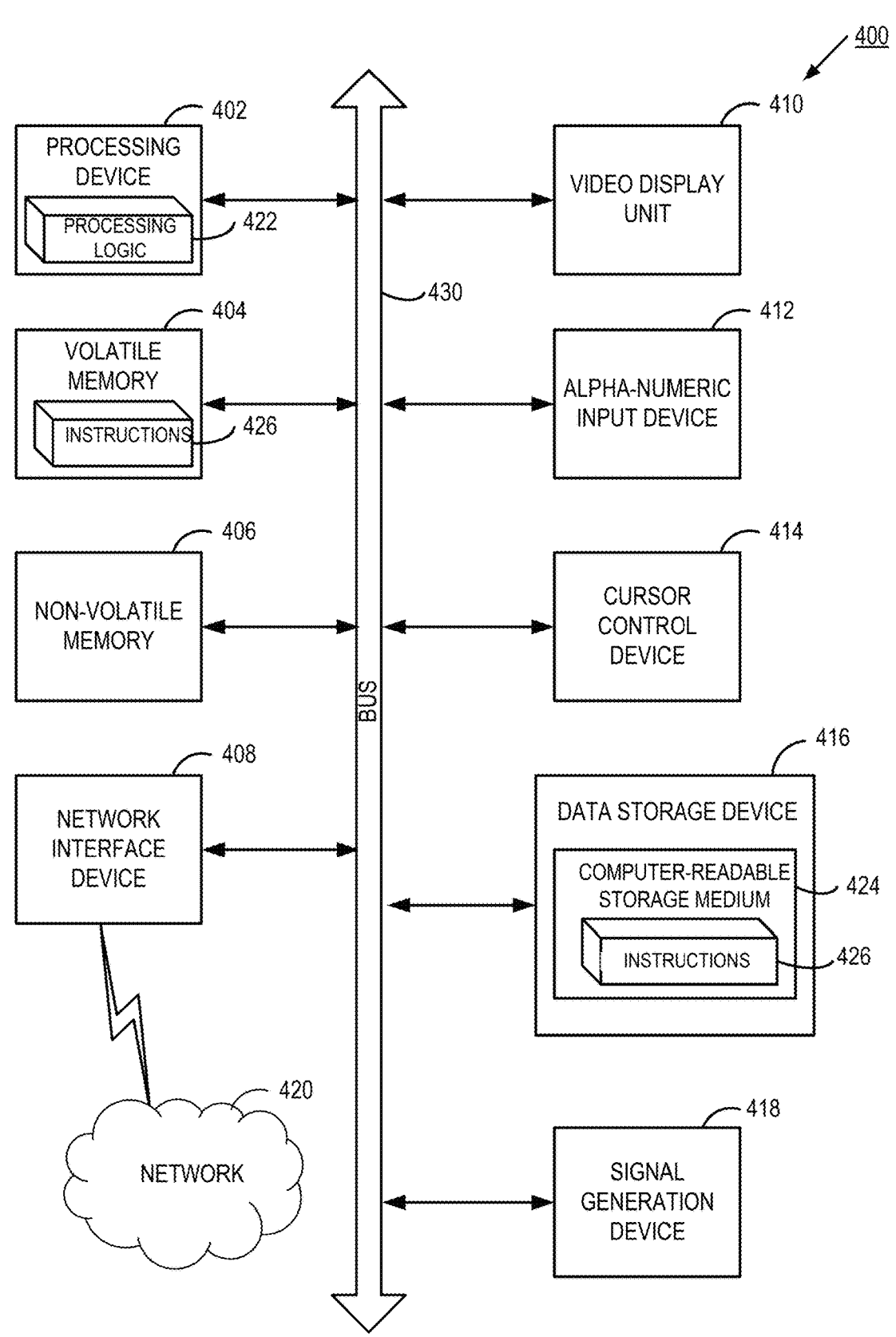
FIG. 4 is a block diagram illustrating an exemplary computer system, in accordance with implementations of the present disclosure.

FIG. 4 is a block diagram illustrating an exemplary computer system 400, in accordance with implementations of the present disclosure. The computer system 400 can correspond to platform 120 and/or client devices 102A-N, described with respect to FIG. 1. Computer system 400 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 440.

Processor (processing device) 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 can also be one or more special-purpose processing devices such as an application specific integrated circuit (ASIC), a field programmable gate array (FPGA), a digital signal processor (DSP), network processor, or the like. The processor 402 is configured to execute instructions 405 (e.g., for determining a time point of a user disengagement with a media item using audiovisual interaction events) for performing the operations discussed herein.

The computer system 400 can further include a network interface device 408. The computer system 400 also can include a video display unit 410 (e.g., a liquid crystal display (LCD) or a cathode ray tube (CRT)), an input device 412 (e.g., a keyboard, and alphanumeric keyboard, a motion sensing input device, touch screen), a cursor control device 414 (e.g., a mouse), and a signal generation device 420 (e.g., a speaker).

The data storage device 418 can include a non-transitory machine-readable storage medium 424 (also computer-readable storage medium) on which is stored one or more sets of instructions 405 (e.g., for determining a time point of a user disengagement with a media item using audiovisual interaction events) embodying any one or more of the methodologies or functions described herein. The instructions can also reside, completely or at least partially, within the main memory 404 and/or within the processor 402 during execution thereof by the computer system 400, the main memory 404 and the processor 402 also constituting machine-readable storage media. The instructions can further be transmitted or received over a network 430 via the network interface device 408.

In one implementation, the instructions 405 include instructions for determining a time point of a user disengagement with a media item using audiovisual interaction events. While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
providing a media item to a user of a platform for an initial viewing;
identifying one or more user interaction events associated with the media item at one or more time points of a plurality of time points within the media item being played;
determining, for each of the one or more user interaction events, an indication of a level of user engagement with the media item being played using:
a correspondence between a position of at least one user interface (UI) element pertaining to presentation of the media item being played at a corresponding time point and a position of a cursor while the media item is being played at the corresponding time point, and
a correspondence between a position of at least one UI element pertaining to audio of the media item being played at the corresponding time point and the position of the cursor while the media item is being played at the corresponding time point;
identifying, based on the indication of the level of user engagement for each of the one or more user interaction events, a time point associated with a level of user engagement that satisfies a level of user engagement criterion, wherein the time point indicates when the user is transitioning to being disengaged with the media item; and
causing playback of the media item to be initiated at the identified time point when the media item is provided to the user for a secondary viewing.

2. The method of claim 1, wherein causing playback of the media item to be initiated at the identified time point comprises storing the identified time point in local memory of a client device of the user.

3. The method of claim 2, wherein the initial viewing is provided to the user via a first client application, wherein the local memory is accessible to the first client application and a second client application, and wherein the secondary viewing is provided to the user via the second client application in response to a second viewing request comprising an indication of the identified time point.

4. The method of claim 1, wherein the one or more user interaction events comprise one or more visual interaction events, and wherein identifying the one or more user interaction events comprises:
identifying one or more images of a UI on a client device, wherein the media item is being presented on the UI;
providing the one or more images as input to a machine learning model, wherein the machine learning model is trained to detect the at least one UI element pertaining to the presentation of the media item and the cursor;
obtaining one or more outputs of the machine learning model, wherein the one or more obtained outputs indicate the position of the at least one UI element in the UI and the position of the cursor; and
identifying, based on the one or more obtained outputs, the one or more visual interaction events.

5. The method of claim 4, wherein the at least one UI element pertaining to the presentation of the media item comprise a media player window presenting the media item, and wherein determining the indication of the level of user engagement comprises:
determining whether a threshold portion of the media player window is visible in the UI; and
if the threshold portion of the media player window is present in the UI, determining a degree of overlap between the position of the cursor and the position of the media player window.

6. The method of claim 1, wherein the one or more user interaction events comprises one or more audio interaction events, and wherein identifying the one or more user interaction events comprises:
identifying one or more images of a UI on a client device, wherein the audio of the media item is being provided on the client device;
providing the one or more images as input to a machine learning model, wherein the machine learning model is trained to detect the at least one UI element pertaining to the audio of the media item;

obtaining one or more outputs of the machine learning model, wherein the one or more obtained outputs indicate a location of the at least one UI element in the UI and a location of the cursor; and identifying, based on the one or more obtained outputs, the one or more audio interaction events.

7. The method of claim 6, wherein determining the indication of the level of user engagement comprises:

determining a degree of overlap between the position of the cursor and the position of the at least one UI element pertaining to audio semantics.

8. The method of claim 1, wherein identifying the time point associated with the level of user engagement that satisfies the level of user engagement criterion comprises:

identifying a first time point associated with a level of user engagement indicating a user transitioning to being disengaged with a video portion of the media item;

identifying a second time point associated with a level of user engagement indicating a user transitioning to being disengaged with an audio portion of the media item; and comparing the first time point with the second time point.

9. The method of claim 8, wherein identifying the time point associated with the level of user engagement that satisfies the level of user engagement criterion further comprises:

responsive to determining that the first time point matches the second time point, saving the first time point as the identified time point.

10. The method of claim 8, wherein identifying the time point associated with the level of user engagement that satisfies the level of user engagement criterion further comprises:

responsive to determining that the second time point precedes the first time point, saving the first time point as the identified time point.

11. The method of claim 8, wherein identifying the time point associated with the level of user engagement that satisfies the level of user engagement criterion further comprises:

responsive to determining that the first time point precedes the second time point, saving either the first time point or the second time point as the identified time point depending on a weight assigned to user engagement in the video portion and a weight assigned to user engagement in the audio portion.

12. A system comprising:

a memory device; and a processing device coupled to the memory device, the processing device to perform operations comprising:

providing a media item to a user for an initial viewing;

identifying one or more user interaction events associated with the media item at one or more time points of a plurality of time points within the media item;

determining, for each of the one or more user interaction events, an indication of a level of user engagement with the media item being played using:

a correspondence between a position of at least one user interface (UI) element pertaining to presentation of the media item being played at a corresponding time point and a position of a cursor while the media item is being played at the corresponding time point, and a correspondence between a position of at least one UI element pertaining to audio of the media item being played at the corresponding time point and the position of the cursor while the media item is being played at the corresponding time point;

identifying, based on the indication of the level of user engagement for each of the one or more user interaction events, a time point associated with a level of user engagement that satisfies a level of user engagement criterion, wherein the time point indicates when the user is transitioning to being disengaged with the media item; and causing playback of the media item to be initiated at the identified time point when the media item is provided to the user for a secondary viewing.

13. The system of claim 12, wherein causing playback of the media item to be initiated at the identified time point comprises storing the identified time point in local memory of a client device of the user.

14. The system of claim 13, wherein the initial viewing is provided to the user via a first client application, wherein the local memory is accessible to the first client application and a second client application, and wherein the secondary viewing is provided to the user via the second client application in response to a second viewing request comprising an indication of the identified time point.

15. The system of claim 12, wherein the one or more user interaction events comprise one or more visual interaction events, and wherein identifying the one or more user interaction events comprises:

identifying one or more images of a UI on a client device, wherein the media item is being presented on the UI;

providing the one or more images as input to a machine learning model, wherein the machine learning model is trained to detect the at least one UI element pertaining to the presentation of the media item and the cursor;

obtaining one or more outputs of the machine learning model, wherein the one or more obtained outputs indicate the position of the at least one UI element in the UI and the position of the cursor; and identifying, based on the one or more obtained outputs, the one or more visual interaction events.

16. The system of claim 12, wherein the one or more user interaction events comprises one or more audio interaction events, and wherein identifying the one or more user interaction events comprises:

identifying one or more images of a UI on a client device, wherein the audio of the media item is being provided on the client device;

providing the one or more images as input to a machine learning model, wherein the machine learning model is trained to detect the at least one UI element pertaining to the audio of the media item;

obtaining one or more outputs of the machine learning model, wherein the one or more obtained outputs indicate a location of the at least one UI element in the UI and a location of the cursor; and identifying, based on the one or more obtained outputs, the one or more audio interaction events.

17. A non-transitory computer readable storage medium comprising instructions for a server that, when executed by a processing device, cause the processing device to perform operations comprising:

providing a media item to a user for an initial viewing;

identifying one or more user interaction events associated with the media item at one or more time points of a plurality of time points within the media item;

determining, for each of the one or more user interaction events, an indication of a level of user engagement with the media item being played using:

a correspondence between a position of at least one user interface (UI) element pertaining to presentation of the media item being played at a corresponding time point and a position of a cursor while the media item is being played at the corresponding time point, and a correspondence between a position of at least one UI element pertaining to audio of the media item being played at the corresponding time point and the position of the cursor while the media item is being played at the corresponding time point;

identifying, based on the indication of the level of user engagement for each of the one or more user interaction events, a time point associated with a level of user engagement that satisfies a level of user engagement criterion, wherein the time point indicates when the user is transitioning to being disengaged with the media item; and causing playback of the media item to be initiated at the identified time point when the media item is provided to the user for a secondary viewing.

18. The non-transitory computer readable storage medium of claim 17, wherein causing playback of the media item to be initiated at the identified time point comprises storing the identified time point in local memory of a client device of the user.

19. The non-transitory computer readable storage medium of claim 18, wherein the initial viewing is provided to the user via a first client application, wherein the local memory is accessible to the first client application and a second client application, and wherein the secondary viewing is provided to the user via the second client application in response to a second viewing request comprising an indication of the identified time point.

20. The non-transitory computer readable storage medium of claim 17, wherein the one or more user interaction events comprise one or more visual interaction events, and wherein identifying the one or more user interaction events comprises:

identifying one or more images of a UI on a client device, wherein the media item is being presented on the UI;

providing the one or more images as input to a machine learning model, wherein the machine learning model is trained to detect the at least one UI element pertaining to the presentation of the media item and the cursor;

obtaining one or more outputs of the machine learning model, wherein the one or more obtained outputs indicate the position of the at least one UI element in the UI and the position of the cursor; and identifying, based on the one or more obtained outputs, the one or more visual interaction events.

\* \* \* \* \*